US010943456B1

(12) United States Patent
Carbonell et al.

(10) Patent No.: US 10,943,456 B1
(45) Date of Patent: Mar. 9, 2021

(54) VIRTUAL SAFETY GUARDIAN

(71) Applicant: International Business Machines Corporation, Armonk, NY (US)

(72) Inventors: Lee A. Carbonell, Flower Mound, TX (US); Jeff Edgington, Fort Worth, TX (US); Tsz S. Cheng, Grand Prairie, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/587,586

(22) Filed: Sep. 30, 2019

(51) Int. Cl.
*G08B 21/02* (2006.01)
*H04W 4/90* (2018.01)
*G06N 3/08* (2006.01)
*G06N 3/04* (2006.01)
*G08B 5/22* (2006.01)

(52) U.S. Cl.
CPC .............. *G08B 21/02* (2013.01); *G06N 3/04* (2013.01); *G06N 3/08* (2013.01); *G08B 5/223* (2013.01); *H04W 4/90* (2018.02)

(58) Field of Classification Search
CPC .......... G08B 21/02; G08B 5/223; G06N 3/04; G06N 3/08; H04W 4/90
USPC .................................................... 340/539.11
See application file for complete search history.

(56) References Cited

U.S. PATENT DOCUMENTS

| 3,778,803 A | 12/1973 | Jahn |
| 5,832,547 A | 11/1998 | Burroughs |
| 6,582,380 B2 | 6/2003 | Kazlausky |

(Continued)

FOREIGN PATENT DOCUMENTS

| CN | 104524747 B | 8/2016 |
| CN | 107972042 A | 5/2018 |

(Continued)

OTHER PUBLICATIONS

"10 Best Pool Alarms to Keep Your Family Safe", Swim University, Last Updated Sep. 5, 2017, 16 pps., <https://www.swimuniversity.com/pool-alarm/>.

(Continued)

*Primary Examiner* — Ojiako K Nwugo
(74) *Attorney, Agent, or Firm* — Daniel R. Simek

(57) ABSTRACT

A method for monitoring safety conditions within an environment includes monitoring an environment by identifying one or more users accessing the environment based on existing and generic profiles selected based on visual recognition and analysis techniques, and consensually monitoring activity within the environment. A context of a situation of the one or more users accessing the environment is determined, based on a set of predetermined rules tailored to the environment, identified users of the one or more users, and monitoring data from monitoring the activity of the one or more users within the environment. Responsive to determining the context of the situation within the environment is an unsafe, based on the monitoring data and the set of predetermined rules, a mitigating action is selected from a set of mitigating actions corresponding to the determined context of the situation, and the mitigating action that is selected is automatically deployed.

20 Claims, 5 Drawing Sheets

(56) References Cited

U.S. PATENT DOCUMENTS

| | | | | |
|---|---|---|---|---|
| 8,384,542 | B1* | 2/2013 | Merrill | G08B 25/08 340/541 |
| 9,523,998 | B2 | 12/2016 | Sukonthapanich | |
| 10,163,323 | B1* | 12/2018 | Wu | G08B 21/086 |
| 2006/0215024 | A1* | 9/2006 | Coonce | G08B 13/19656 348/143 |
| 2007/0120697 | A1* | 5/2007 | Ayoub | B60R 11/0235 340/686.1 |
| 2007/0152807 | A1* | 7/2007 | Huang | G06K 9/00771 340/521 |
| 2008/0048870 | A1* | 2/2008 | Laitta | G08B 25/08 340/573.6 |
| 2012/0022716 | A1* | 1/2012 | Kitahama | G05D 1/0212 701/1 |
| 2016/0155314 | A1 | 6/2016 | Snyder | |
| 2018/0108236 | A1* | 4/2018 | Kanukurthy | A62B 9/006 |
| 2018/0315200 | A1 | 11/2018 | Davydov | |
| 2020/0019174 | A1* | 1/2020 | Cheriton | G05D 1/0214 |
| 2020/0175844 | A1* | 6/2020 | Bravo Orellana | G08B 13/19682 |

FOREIGN PATENT DOCUMENTS

| | | |
|---|---|---|
| EP | 2701130 A1 | 2/2014 |
| WO | 2017130187 A1 | 8/2017 |
| WO | 2019083442 W | 5/2019 |

OTHER PUBLICATIONS

"AngelEye", Privacy Policy—2019 © Copyright—AngelEye Srl—All rights reserved—powered by Marketing & Development, 1 pp., <https://angeleye.it/>.

"Cost Efficient, Technology-Based Community Security Solutions", Envera, 3 pps, © Envera Systems—All Rights Reserved | Powered by Pace Adv, <https://enverasystems.com/>.

"Drowning is Preventable", 20 pps., Poseidon by Maytronics, © Copyright 2019 Poseidon Australia, <https://www.drowningprevention.com.au/>.

"Pool Safety Equipment", 6 pps., swimmingpool.com, <https://www.swimmingpool.com/pool-living/pool-safety/pool-safety-equipment>.

"Poseidon—Computer vision system for the detection of drowning accidents in swimming pools", Maytronics Australia, Published on Apr. 17, 2018, YouTube, 2 pps., <https://www.youtube.com/watch?v=Aau8ppypgYg&feature=youtu.be>.

"Robotic lifeguards to be used in Myrtle Beach", 4 pps., WMBF News, Mar. 20, 2018, <https://www.wmbfnews.com/story/37765645/robotic-lifeguards-to-be-used-in-myrtle-beach/>.

Leber, "A Flying Lifeguard Robot Could Save You From Drowning", Jan. 29, 2014, Fast Company & Inc © 2019, 8 pps., <https://www.fastcompany.com/3024583/a-flying-lifeguard-robot-could-save-you-from-drowning>.

Maurer, "Prevent Pool Disasters With These Top Pool Safety Products", Oct. 26, 2018, safewise, 8 pps., <https://www.safewise.com/blog/gadgets-will-keep-swimming-pool-safe/>.

* cited by examiner

VIRTUAL SAFETY GUARDIAN

FIELD OF THE INVENTION

The present invention relates generally to the field of automated monitoring and response, and more particularly to cognitive monitoring of an environment area for automated safety risk detection and response.

BACKGROUND OF THE INVENTION

Many work environments include activities of users using and developing skills, and recreational environments offer users opportunities for enjoyable and entertaining activities and may include gatherings of friends and family. Environments that include or encourage user activities that are purposeful, or fun can also host user activity that is risky, unsafe, or undesirable. Along with the positive aspects of accomplishment or enjoyment of user activities in certain environments are concerns directed to safety and liability. Because of such risks, users may avoid participation in certain environments, and providers of activity environments may withhold or withdraw interest and investment.

Environments may include, for example, but are not limited to: construction areas, manufacturing areas, commercial kitchens, playgrounds, parks, swim areas, warehouses, and defined environmental area that includes activity by users that may include or lead to unsafe conditions. Often, potential risk situations require human monitoring that can suffer from inattention, distraction, or fatigue, but this is unrealistic for many instances. Other approaches rely on access control, auto-alert devices and even mechanical equipment; however, implementing protective devices and equipment still relies on human evaluation and response.

SUMMARY

Embodiments of the present invention disclose a method, computer program product, and system. The embodiments provide a method to monitor safety conditions within an environment. A computing device monitors and identifies one or more users accessing the environment based on existing profiles and generic profiles selected based on visual recognition and analysis techniques. The computing device determines a context of a situation of the one or more users accessing the environment, based on a set of predetermined rules tailored to the environment, identification of the one or more users, and consensually monitoring data of behavioral activity of the one or more users within the environment. Responsive to determining a safety risk in the environment, based on a violation of the set of predetermined rules, a mitigating action corresponding to the determined safety risk is selected from a plurality of mitigating actions, and the mitigating action is automatically deployed.

DETAILED DESCRIPTION

Figure 1:
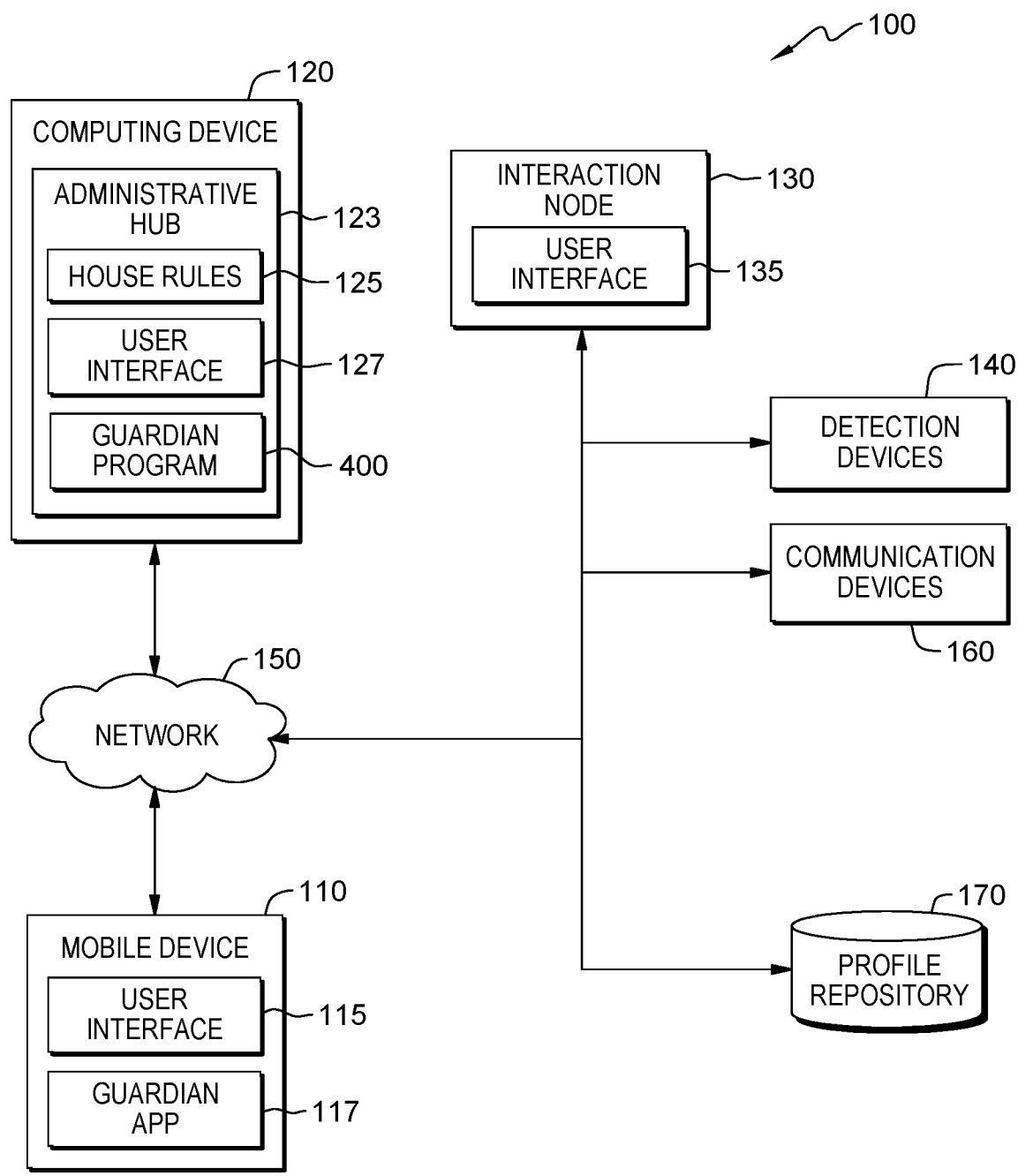
FIG. 1 is a functional block diagram illustrating a distributed data processing environment, in accordance with an embodiment of the present invention.

Embodiments of the present invention recognize that certain environments carry higher levels of safety concerns and liability risks, such as environments that include unstructured children's activities, environments that include human, automotive, and mechanical activity, fire or heat sources, cutting or slicing activity, and activity in or around water. Methods and systems that mitigate exposure and prevent accidents are of high interest, but often the mitigating method or system requires constant and high-level human interaction, which in many cases is unrealistic. Embodiments of the present invention recognized that detection and automation techniques can generate alerts and awareness; however, varying user activity and environmental conditions as well as attributes and activity skill level of participating users are not served well by actions deployed independent of the context of a situation and an activity. Often human intervention remains an integral part of risk mitigation to evaluate the situational context and determine an appropriate action or response.

Embodiments of the present invention provide a virtual safety guardian. The virtual safety guardian, also referred to herein as "the guardian" or the guardian system," facilitates prevention and mitigation of safety risk by identifying the situational context of the activity within an environment, such as construction areas, manufacturing areas, commercial kitchens, playgrounds, parks, swim areas, warehouses and defined environmental areas that includes activity by users that are unsafe or may lead to unsafe conditions. The guardian system dynamically interacts with users and equipment to analyze behavioral activity, assess participating users' activity and behavior, consider rules established for the particular environment, determines risk, and executes appropriate mitigating actions. Unsafe conditions, such as unusual behavior or in some environments, un-monitored children in the environment, are determined based on profile information of users identified in the environment area or associating identified characteristics of the user and associating the characteristics with generic profiles most closely matching the observed user. The guardian system employs pre-determined rules configured for the particular environment, referred to herein as "house rules," which are applied in conjunction with machine learning techniques to identify unsafe or potentially high-risk situations within the environment. An appropriate automated response or intervening measure is generated based on the given situation and context of activity within the environment area with respect to the profile information of users performing the activity.

Embodiments of the present invention employ the use of video cameras, sensors, microphones, house rules, and user profile information as input, and apply machine learning and neural network analytical techniques to detect, identify, monitor, and track user behavior in and around the environment area to determine risk level and dangerous behavior. In some embodiments, audio analytics are performed on detected audio disturbances within the environment area as well as user vocal content. Speakers enable communication and instruction services, facilitating conversation capability and interaction with users in the environment area without human intervention. In some embodiments, a display, touchscreen interface, and keyboard/keypad are used for interactive exchange of information and response with users.

Embodiments of the present invention continuously analyze behavior and conditions of the environment area, determine risks, and automatically deploy a mitigating action appropriately corresponding to the determined level of risk. In some embodiments, mitigating actions are selected from a library of available instructions, responses, interventions, or mechanisms as appropriate to mitigate the risk or address identified dangerous conditions. Responses may include, for example but are not limited to: sounding a siren/alarm, giving a warning instruction, locking access gates, alerting a designated user, either within or outside of the environment area, deploying floatation devices, initiating fire suppression, activating protective devices, and contacting emergency services (911). Embodiments of the present invention automatically monitor, detect risk, and enforce house rules corresponding to the environment area, and deploy risk-mitigating actions.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 110, computing device 120, interaction node 130, detection devices 140, communication devices 160, and profile repository 170, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between mobile device 110, computing device 120, interaction node 130, detection devices 140, communication devices 160, and profile repository 170, in accordance with embodiments of the present invention.

Mobile device 110 is a computing device that includes user interface 115, and guardian application (app) 117. Mobile device 110 can be a standalone computing device, a smart phone, a tablet computer, a laptop computer, or any other electronic device or computing system capable of receiving, sending, and processing data. In other embodiments, mobile device 110 can represent a computing device interacting with applications and services hosted and operating in a cloud computing environment. In another embodiment, mobile device 110 can be a netbook computer, a desktop computer, a personal digital assistant (PDA), or other programmable electronic device capable of communicating with computing device 120, guardian program 400, interaction node 130, detection devices 140, communication devices 160, profile repository 170, and other computing devices (not shown) within distributed data processing environment 100 via network 150. In another embodiment, mobile device 110 represents a computing system utilizing clustered computers and components (e.g., database server computers, application server computers, etc.) that act as a single pool of seamless resources when accessed within distributed data processing environment 100. Mobile device 110 may include internal and external hardware components, as depicted and described in FIG. 5.

User interface 115 provides an interface for users to access features and functions of mobile device 110, including guardian app 117. In some embodiments of the present invention, user interface 115 provides alert and notification communications regarding a corresponding environment area. In some embodiments, user interface 115 enables viewing of logged and live-stream video and audio content via connection to guardian program 400 operating on computing device 120. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of mobile device 110. User interface 115 enables a user of mobile device 110 to receive, view/hear, and respond to input, access applications, and perform function available on mobile device 110.

Guardian app 117 is an application operating on mobile device 110 and provides a mobile interface for administrators, supervisors, and designated contacts for an environment area. In some embodiments of the present invention, guardian app 117 receives alerts and notifications from guardian program 400 in response to alerts from detection devices 140, or violation of house rules 125, and to provide notification of risk, unsafe, or dangerous situations associated with activity and behavior of users within the environment area. In some embodiments, guardian app 117 provides photo or video display associated with an alert or notification. In other embodiments, guardian app 117 provides a description of conditions initiating the alert or notification.

In some embodiments, guardian app 117 includes communication functions connected to interaction node 130 enabling communication with and audio monitoring of users in the environment area. In yet other embodiments, guardian app 117 includes an action override capability for the user of guardian app 117 to immediately initiate a selected action. In some embodiments, a fast connection to a 911 service is included in guardian app 117 functionality. In some embodiments of the present invention, guardian app 117 includes connection access to guardian program 400 to review and adjust house rules 125, review logged monitoring data, including video and audio monitoring, and view live monitoring of activity within the environment area.

Computing device 120 includes administrative hub 123, house rules 125, user interface 127, and guardian program 400. In some embodiments of the present invention, computing device can be a server computer, a blade computer, a laptop computer, a tablet computer, a netbook computer, or any other programmable electronic computing device capable of receiving, sending, and processing data, operating guardian program 400, and communicating via network 150 with mobile device 110, guardian app 117 operating on mobile device 110, interaction node 130, detection devices 140, communication devices 160, profile repository 170, and other computing devices (not shown) within distributed data processing environment 100 via network 150. In other embodiments, computing device 120 can represent a virtual computing device operating based on multiple computers as a server system, such as in a cloud computing environment. In another embodiment, computing device 120 represents a computing system utilizing clustered computers and components (e.g., database server computers, application server computers, etc.) that act as a single pool of seamless resources when accessed within distributed data processing environment 100. Computing device 120 may include internal and external hardware components, as depicted and described in FIG. 5.

Administrative hub 123 is an interface for an administrator of the guardian system of the environment area to perform setup operations and subsequent updates for the environment area including user profiles, house rules 125, adding or updating detection devices 140 and communication devices 160, mitigating action responses, and association of responses to risk levels. In some embodiments of the present invention, an administrator of the environment area reviews and classifies/tags logged monitoring data as supervised learning input to enable guardian program 400 to continually learn via machine learning and improve detection of unsafe situations and appropriate response actions in the context of the house rules 125 and the profile information of users present in the environment area. Administrative hub 123 is used to setup and activate detection devices 140 and communication devices 160, to provide monitoring input and enable cognitive conversational interaction with users. In some embodiments, administrative hub 123 includes access to generic profiles for users, enabling initial setup or classification of new users to the environment area, as well as establishing warning, alert, and action over-ride preferences. In other embodiments, users may be associated with generic profiles based on characteristics determined by video and sensor monitoring from detection devices 140.

House rules 125 is a configurable set of rules and conditions set by an administrator of the environment area defining a context of behavior and/or conditions of the environment area and profile information of users within the environment area, considered to be unsafe or exceeding a level of risk. In some embodiments, house rules 125 can be selected from generic templates or customized to the knowledge and preferences of the environment area administrator, and in some embodiments, the established house rules 125 may be shared or provided as part of a set of generic rules made available to other administrators of other environment areas. House rules 125 may include consideration of conditions of the environment area during use (i.e., day/night, number of users, presence of supervision, behavioral activity of users within the environment area, attentiveness of users to other machines, activity, and conditions within the environment area, and responsiveness of users to automated queries and instructions). House rules 125 is configurable and updated over time to reflect changes in the environment area, user activity skill level, behavior, or situational context encountered.

User interface 127 provides users of administrative hub 123 an interface to access setup and update functions of guardian program 400. In some embodiments, user interface 127 enables viewing of logged and live-stream video and audio via connection to guardian program 400 operating on computing device 120. In one embodiment, user interface 127 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 127 may also be application software that provides an interface to functions of administrative hub 123. User interface 127 enables an administrator of an environment area operating on administrator hub 123, to setup, configure, and update detection devices 140, communication devices 160, generate and update house rules 125, link responses to detected risk behavior or safety concerns, provide instructions, alerts, notifications, and enable supervised learning input for classifying/tagging logged monitoring data for continuous machine learning.

Guardian program 400 operates on computing device 120 and provides services for automatically detecting unsafe conditions within an environment area and deploying severity level appropriate responses. In some embodiments of the present invention, with condition of implied or provided consent, guardian program 400 receives video and audio monitoring data as well as motion detection and other environment-specific sensory input from detection devices 140. Guardian program 400 includes user recognition functions to associate users approaching or entering the environment area with a user profile stored in profile repository 170. In some embodiments, guardian program 400 uses facial recognition to identify users accessing the environment area. In other embodiments, recognition techniques such as fingerprint identification, voice recognition, barcode, smart card, or passcode techniques may be used to identify a user accessing the environment area. Guardian program 400 associates an identified user with a corresponding profile that includes information regarding the age, activity skill level, and other pertinent attributes relative to the user's behavior and activity within the environment area. In some embodiments, guardian program 400 generates profiles of detected users within the environment area by determining characteristics of the user and applying a generic profile most closely corresponding to the characteristics (i.e., physical characteristics may indicate young child, teenager, adult, senior, injury recovery, etc.).

Guardian program 400 includes communication capability with users detected in the environment area by use of communication devices 160. Communication capabilities include interaction with unidentified users, receiving input to queries, providing instruction to users, and enabling alerts, notifications, and emergency contacts as appropriate. In some embodiments, guardian program 400 is communicatively connected to interaction node 130, which enables users to view information on a display and provide input associated with use of the environment area according to house rules. In some embodiments, guardian program 400 communicates with users of the environment area via wireless devices (headset, earbuds and microphone), in noisy or loud activity environment areas. In some embodiments, guardian program 400 is accessible from mobile device 110 via guardian app 117. Guardian program 400 provides alerts, enables viewing of live stream user activity within environment area or view of logged monitoring data. Guardian program 400 receives input from mobile device 110 that enables an over-ride of response actions and connection to emergency contacts via guardian app 117.

In some embodiments of the present invention, guardian program 400, using user interface 127 of administrative hub 123 operating on computing device 120, provides for setup of user profiles, sharing of profiles, take-it-with-you profiles, house rules 125, behavior monitoring classified/tagged to safety/risk conditions, and enables review of logged activity monitoring for supervised learning as part of continuous machine learning. In some embodiments supervised learning techniques are augmented with unsupervised learning applied to a neural network of machine learning. Guardian program 400 includes a cognitive behavior model that can recognize behavioral activity of users in the environment area, trained by machine learning and/or neural network techniques. The cognitive behavior model of guardian program 400 enables understanding of the context of activity and behavior within the environment area by monitoring and comparing against previously modeled and tagged behavior and defined rules of house rules 125. Guardian program 400 leverages the cognitive behavior model capabilities, machine learning, and house rules 125 to determine the risk level and provide an automated response action that is appropriate for the determined risk level situation. In embodiments in which users repetitively occupy an environment area, guardian program 400 includes the ability to "train" or tune the profile of individual users based on manual or automated updates to the behavior model via recorded monitoring activities and determined changes to activity skill level.

Guardian program 400 may include a default initial set up of the cognitive behavior model with subsequent training by receipt of logged monitoring of user activity that is tagged or classified to identify various behaviors, conditions, and situational context of users in the environment area.

Guardian program 400 may utilize an escalating set of responses to unsafe or risk situations and conditions that are detected. In some embodiments, guardian program 400 may interact with users via user interface 135 of interaction node 130 for user identification or requiring user response to an audio query of the environment area or user's condition. In some embodiments, in response to determining an unsafe or risk situation, guardian program 400 may signal an audio query and monitor for response, trigger an alarm, secure access gates, initiate fire suppression, deploy floatation devices, initiate protective shields, contact to users of mobile device 110, or contact 911 emergency services.

Interaction node 130 enables cognitive interaction with users of the environment area. Interaction node 130 includes audio and video input analysis and in some embodiments of the present invention, includes conversational services interacting with users accessing or within the environment area. In some embodiments, interaction node 130 may perform interactive identification of users, by use of facial recognition and auditory response to confirm identities, or request identity input of unidentified users. In some embodiments, with implied or provided consent, unidentified users may be required to input personal profile information to interaction node 130 to establish information regarding activity skill level and other behavioral attributes for activity monitoring of risk, unsafe, or dangerous conditions. Interaction node 130 may deliver audio queries for active users of the environment area to confirm an "OK" condition. In other embodiments, interaction node 130 provides a display from which users of the environment area may interact with administrators, supervisors or contacts associated with the environment area.

User interface 135 provides users of interaction node 130 an interface to provide input in response to audio queries or to present identification information. In some embodiments, user interface 135 includes a display for viewing interaction with an administrator, supervisor, or other contact associated with the environment area. In one embodiment, user interface 135 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 135 may also be application software that provides an interface to functions of interaction node 130. User interface 135 operating on interaction node 130, enables an administrator or other contact associated with the environment area to present and explain rules of house rules 125 and other behavior guidance, via guardian program 400, to users accessing the environment area, and in some embodiments, may provide instructions, alerts, and notifications in response to detection of risk, unsafe, or dangerous conditions and behavior.

Detection devices 140 include a set of devices and sensors located throughout the environment area to provide input monitoring of access, activity, and behavior within the environment area, and initiate responses to risk, unsafe, or dangerous situations and conditions detected within the environment area. In some embodiments of the present invention, detection devices include a set of cameras for video monitoring, a set of microphones to monitor audio input from the environment area, motion detectors, proximity sensors, wave detection sensors, heat detection, and devices to control access to the environment area. In some embodiments detection devices 140 may include response and rescue devices, such as sounding alarms, vocalizing instructions or queries, locking/unlocking access gates, generating contact alerts, auto deployment of floatation devices, and auto deployment of fire suppression or protective shields.

Communication devices 160 include a set of devices to enable monitoring of audible activity and responses within the environment area and generating queries or instructions to users. Communication devices 160 includes microphones and speakers located throughout the environment area, and may include one or more displays and input devices, such as a keyboard, keypad, barcode reader, RFID reader, or other input/output devices, enabling interaction between users of the environment area and guardian program 400. Communication devices 160 are communicatively connected to guardian app 117 operating on mobile device 110, enabling a user of guardian app 117 to interact with users and activity within the environment area. Communication devices 160 is configured to generate alerts, notifications, and contact emergency services as responses to detected unsafe activity, behavior, or conditions.

Profile repository 170 is a collection of user profiles that include information associated with respective identified users of the environment area. In some embodiments of the present invention, profile repository 170 includes a set of default profiles that can be assigned to users based on performing a "best match" between the description of the default profile regarding attributes of a user and the user assigned the default profile. The profile may include information regarding the age (could be relative age) of the user, size, physical shape, characteristics of movement, attributes of known user behavior, physical ability of the user, and the assessed or volunteered activity skill level of the user. For example, a profile may include relative age selection options of: "infant, toddler, youth, teenager, adult, and senior"; characteristics of: "reserved, average, daring, and influenced by others"; physical ability of the user may include selections such as: "weak, normal, strong, and injured"; and activity skill level may include selections of: "new-beginner, experienced, expert." In other embodiments a user profile is custom created to more accurately match the corresponding user and is updated based on observed changes to the user's skill level and behavior. User profiles are stored in profile repository 170 and may be shared or transmitted to another repository or another partition within a multi-user repository.

In some embodiments of the present invention, profile repository 170 includes user profiles that are auto-selected based on monitored characteristics, whereas in other embodiments, the user profile is generated by an administrator of the environment area, initially by selection of default profiles items, and updated or tuned by categorizing recorded behavior monitoring as supervised learning for the cognitive behavior model of guardian program 400. In some embodiments the profile of an identified user of the environment area is automatically updated based on the activity and behavior monitoring of the user within the environment area. In some embodiments, an unidentified user may be queried for input by guardian program 400 via user interface 135 of interactive node 130 for the user's information including a self-assessment of activity skill level. The unidentified user is given an identity in a user profile and the associated profile may be updated based on monitoring of the user's activity and behavior.

In some embodiments, profile repository 170 includes template profiles that may be shared or used by multiple administrators of respective environment areas. In some embodiments, a user profile may be forwarded to another environment area, "accompanying the user as they go."

Figure 2:
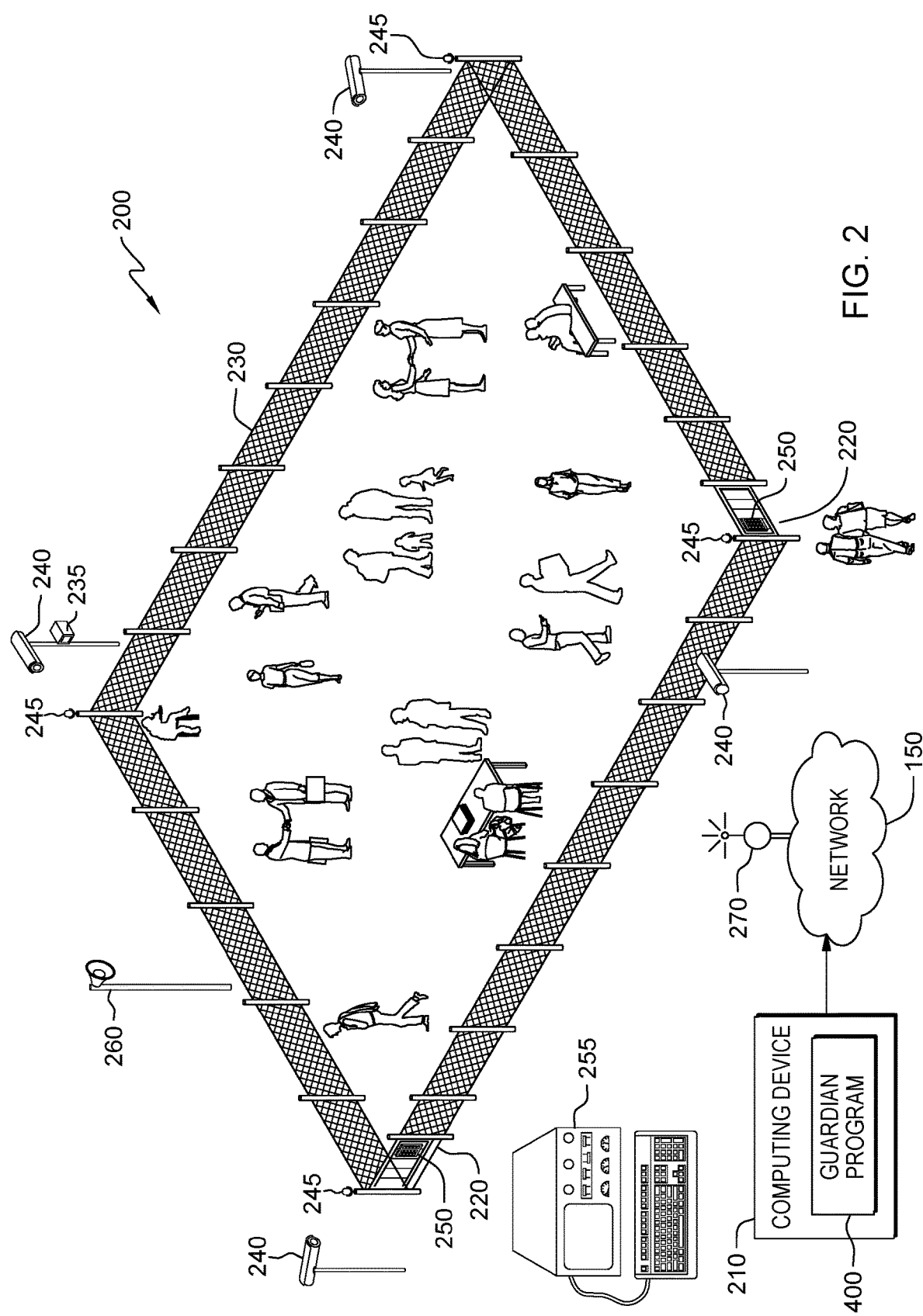
FIG. 2 illustrates an exemplary environment adapted to monitor access and activity within an environment, determine context of the activity, and respond with an appropriate action, in accordance with an embodiment of the present invention.

FIG. 2 illustrates an exemplary implementation of an embodiment of the present invention within environment area 200, adapted to monitor access and activity, determine context of activity, and respond with an appropriate action, in accordance with an embodiment of the present invention. Environment area 200 represents a set of users engaged in generic activities. Environment area 200 includes computing device 210, access gate 220, environment area barrier 230, motion sensor 235, cameras 240, microphones, 245, keypad 250 speaker 260, all connected by wireless connections 270 via network 150. Computing device 210 is similar to the description of computing device 120 of FIG. 1, provided above. Computing device 210 is depicted as including guardian program 400. In some embodiments of the present invention, guardian program 400 may reside in computing device 210 locally in the vicinity of environment area 200 or in other embodiments, guardian program 400 may operate on computing device 210 as part of a remote computing service in a cloud environment, connected to devices of environment area 200 via network 150. Access gate 220 provides access to users of environment area 200 and is controlled by guardian program 400 enforcing rules of house rules 125 (FIG. 1) and in some embodiments, enabling access via use of keypad 250. Keypad 250 enables entry to environment area 200 by disabling a locking mechanism of access gate 220. Environment area barrier 230 encompasses environment area 200 and prevents access except through access gate 220. Although one access gate is depicted in FIG. 2 as an example, implementations may include multiple access points.

Motion sensor 235 detects movement within environment area 200 and transmits detection of movement to guardian program 400. Guardian program 400 determines whether detection of movement is expected or unexpected based on the context of activity within environment area 200 and house rules associated with environment area 200. Responsive to detection of movement from motion sensor 235 and violation of house rules (of house rules 125) indicating an unsafe situation, guardian program 400 initiates an appropriate response, based on the cognitive behavior model receiving monitoring of activity, user profile information of users within environment area 200, and house rules 125.

Cameras 240 and microphones 245 monitor video and audio, respectively, within environment area 200. Cameras 240 enable facial recognition of users accessing environment area 200 as well as providing video monitoring input of behavior, activity, and conditions within environment area 200. Microphones 245 provide audio input of activity within environment area 200, and enable conversational services to interact with users, such as intermittent query and anticipated response of whether a user is "OK" or instructions to cease a particular behavior. In some embodiments, the monitoring of video and audio is logged and reviewed by an administrator of environment area 200, which may be reviewed using interactive node 255, or mobile device 110 combined with guardian app 117. The administrator of environment area 200 may categorize or tag logged monitoring data and input the categorized data as supervised learning content for the cognitive behavior model of guardian program 400.

Interactive node 255 is depicted as a point of interaction between guardian program 400 and monitoring of environment area 200 and has features and functions similar to those of interactive node 130, described above. Interactive node 255 enables cognitive interaction with users accessing or occupying environment area 200, or an administrator of environment area 200 via guardian program 400. Interactive node 255 is communicatively connected to computing device 210 and guardian program 400, and may include a user interface for user input, user receipt of machine vocal instructions, or display of information. Environment area 200 also includes speaker 260, which enables guardian program 400 to provide audio output for queries or instructions to user, or to emit an alarm.

Figure 3:
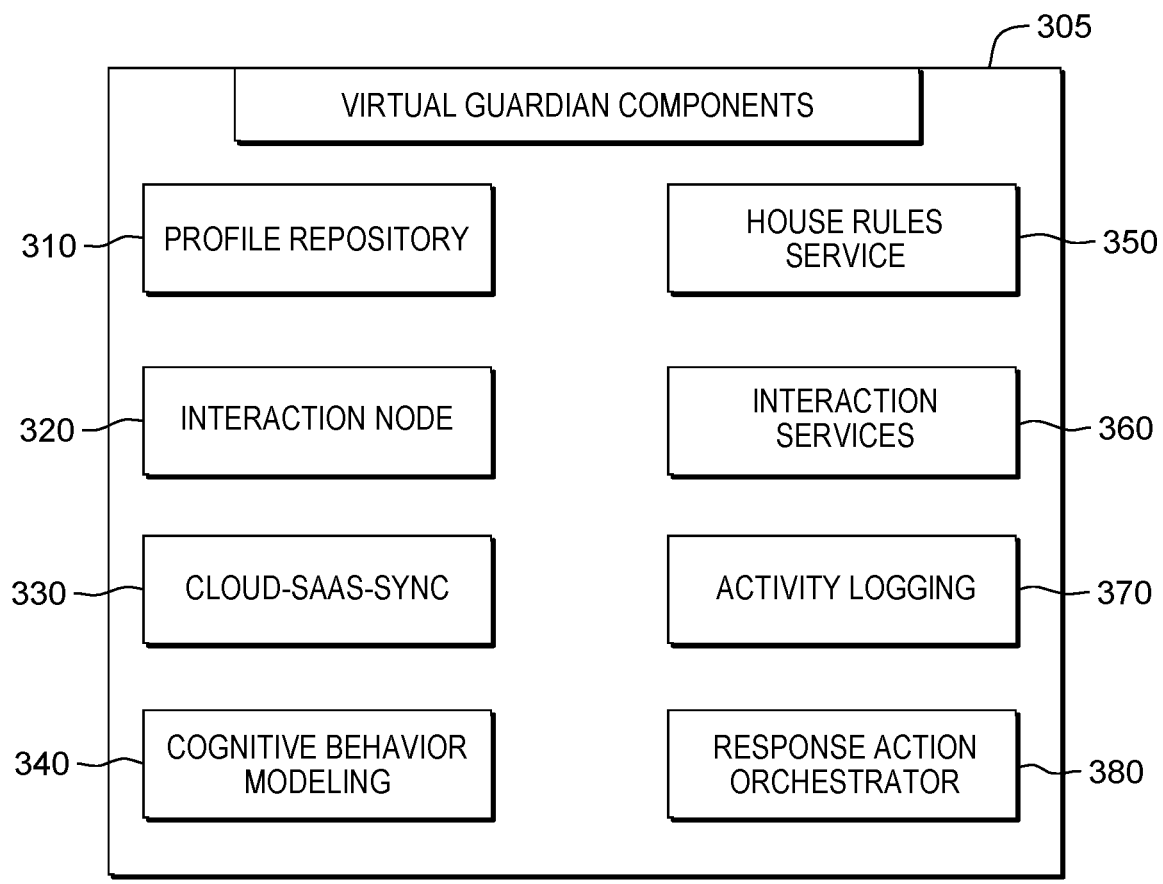
FIG. 3 is a block diagram depicting components of a virtual safety guardian system operating within the distributed data processing environment of FIG. 1, in accordance with an embodiment of the present invention.

FIG. 3 is a block diagram depicting component details of the virtual guardian system operating within the distributed data processing environment of FIG. 1, in accordance with an embodiment of the present invention, (hereafter, "guardian components"). Components of the environment area include profile repository 310, interaction node 320, cloud-SAAS-Sync 330, cognitive behavior modeling 340, house rules service 350, interaction services 360, activity logging 370, and response action orchestrator 380.

Profile repository 310 includes profiles of users, which in some embodiments, includes the user's name, age, activity skill level, and behavior characteristics. In some embodiments, including implied or provided consent, some identification aspect of the user is included in the profile for identification, such as facial image, finger print, voice print, or identification object (e.g., smart card, barcode, RFID chip). In some embodiments, the user profile is optionally sharable with other administrators of other environment areas, enabling a "take-it-as-you-go" feature for users.

In some embodiments of the present invention, profile repository 310 also includes equipment profiles containing information corresponding to various equipment used in environment area 200. For example (referring to FIG. 2), equipment profiles include information for microphones 245, cameras 240, keypad 250, motion sensor 235, as well as proximity sensors (not shown) that combine to monitor environment area 200. In some embodiments, profiles of preventative and rescue equipment are included in profile repository 310, such as interactive node 255, speaker 260, fire suppression devices, and deployable floatation devices. In addition, profile repository 310 includes administrator profiles, authorizing setting and updating of house rules, setting notification and alarm preferences, over-ride of response actions, and access to view and categorize or tag logged monitoring activity within environment area 200.

Interaction node 320 enables user interaction with guardian program 400 and includes input from video cameras and audio input from microphones and may include additional input/output devices such as a keyboard, mouse, touch screen, sensors to read RFID, barcodes, biometric data, and other wireless connections. Interaction node 320 is connected to guardian program 400 via network connection, (i.e., network 150 and wireless connection 270).

In some embodiments of the present invention, guardian program 400 is hosted in a cloud computing environment and includes a component provided as cloud -SaaS—sync 330 (software as a service). Guardian program 400 has access to rules of house rules 125, profile repository 310, and interactive node 320, via network connection. In some embodiments, guardian program 400 receives monitoring input from the environment area, performs analysis on the received data, and provides results and logs the activity in storage local to the environment area.

Guardian program 400 includes cognitive behavior modeling 340 as a component. Cognitive behavior modeling 340 includes a deep learning engine that learns association of environment area user activity and normal, inappropriate, dangerous, or emergency context situations, based on activity samples provided as input and machine learning techniques. In some embodiments, logged monitoring activity is categorized by an administrator of the environment area and provided as supervised learning content to cognitive behavior modeling 340. Cognitive behavior modeling 340 evaluates audio and video feedback as well as information from sensors, determines a current situation and context of the activity within the environment area, and performs a response action corresponding to the determined context of activity. In some embodiments, the responses may follow an escalation of actions, based on whether the situational context remains or is determined to be more urgent. Cognitive behavior modeling 340 receives information from an administrator for activity behavior classification, profile creation or update, and association or relationships of profiles. In addition, cognitive behavior modeling 340 continues refining determination of unsafe situations based on neural network training from ongoing monitoring and administrator input.

House rules service 350 is a component of the virtual guardian system, and includes rules established by the administrator of the environment area, used to determine whether monitored behavior and activity (as well as access and conditions) within the environment area indicates a violation of house rules, a concerning or dangerous situation, or an emergency. In some embodiments, a set of default house rules may be available to the administrator for selection and/or modification, including templates aligning behavior and response. In other embodiments, the administrator categorizes logged monitoring data to align with a particular situation within a context of the environment area. House rules may include aspects of schedule, which defines timeframes in which users may access the environment area and may include specific rules based on a user's profile information. In some embodiments, the house rules may include a decision tree to determine response actions, with escalation of responses dependent on the status of the situation and context of activity. House rules service 350 includes preferences of notification, alert, alarm, response and action to unidentified users, prevention of access, and the ability to update house rules on an on-going basis and may have user profile dependencies. In some embodiments, rules of house rules service 350 are generalized and included in an online repository accessible by other administrators of other environment areas.

Interaction services 360, as a component of the virtual guardian system, includes analysis of audio and video input, and may include analysis of other sensory input, in combination with video and audio. Interaction services 360 enables identification of users and behavior and activity evaluation. Interaction services 360 identifies sounds within the environment area that may indicate certain activity, situations, or behavior context, such as laughter, screams, silence, normal dialog, splashing, or an absence of sounds. Interaction services 360 provides a conversational service that uses natural language techniques and speech recognition to perform interactive dialogs with users within the environment area, such as asking if a particular user is "OK", needs help, instructing to cease an activity, or is unresponsive.

Activity logging 370 is a component of the virtual guardian system that stores monitoring data of the environment area, which in some embodiments of the present invention includes detection of sensor data, video and audio monitoring, output of the analysis of detected sensor data and video and audio monitoring, input and output of conversational services, alerts and notifications generated, response actions taken, and over ride input received.

Response action orchestrator 380 is a component of the virtual guardian system that matches an appropriate response (which includes no response) to a determined situation in context of activity, behavior, and conditions within the environment area. Response action orchestrator 380 interacts with physical equipment of the environment area, such as (referring to FIG. 2) access gate 220, interactive node 255, speaker 260, and external systems such as telephonic connections, short message service (SMS) messages, rescue assistance devices, fire suppression devices, and protective shielding devices. Response action orchestrator 380 also includes alarm, alert, notification, and contact communication features in response to determined unsafe conditions, matching an appropriate response to the determined condition. Response action orchestrator 380 performs response actions based on guardian program 400 determining a particular condition or situations in the context of user behavior and activity, consistent with house rules.

Figure 4:
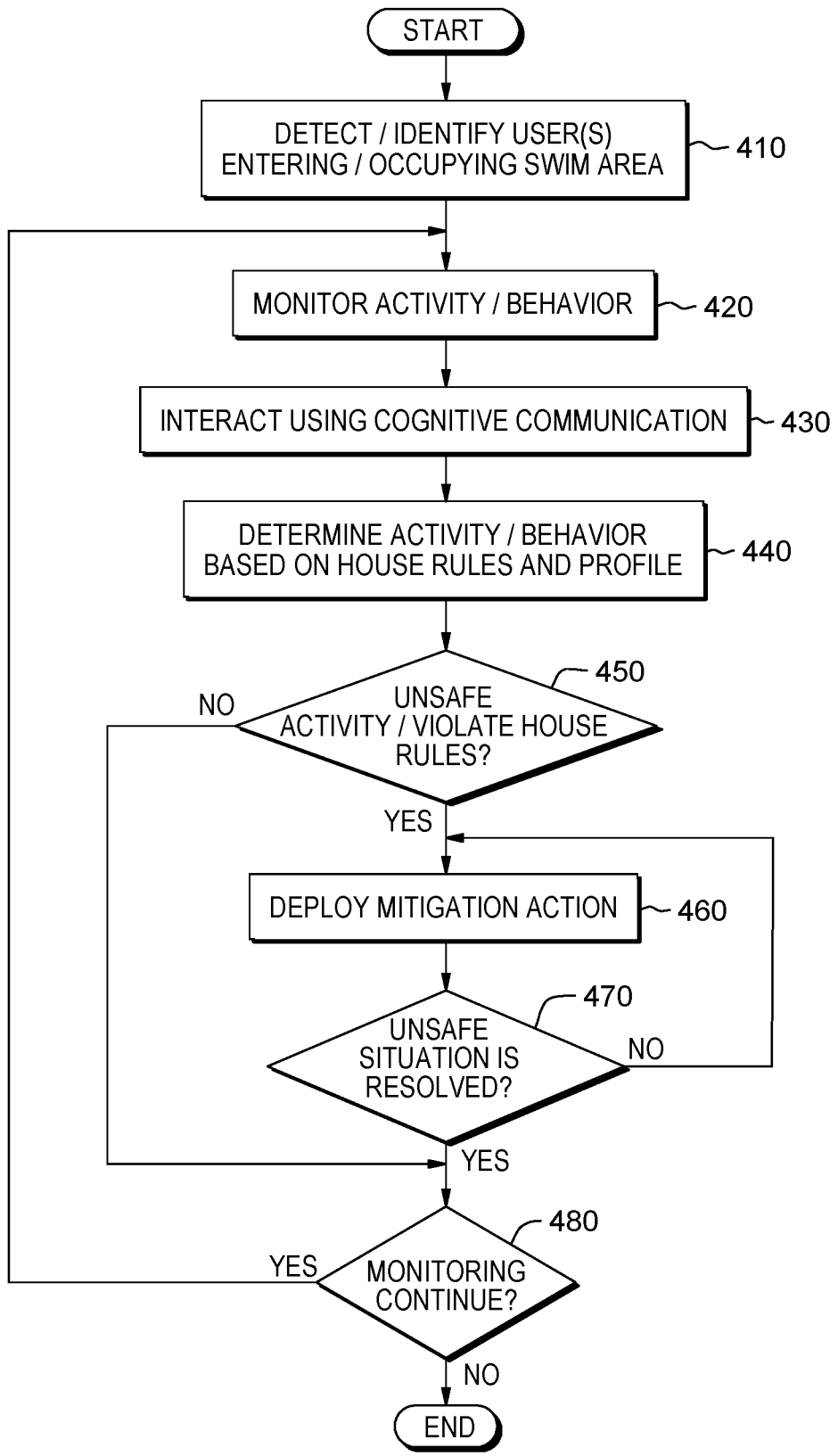
FIG. 4 is a flowchart illustrating the operational steps of a guardian program operating within the distributed data processing environment of FIG. 1, in accordance with an embodiment of the present invention.

FIG. 4 is a flowchart illustrating the operational steps of guardian program 400 operating within the distributed data processing environment of FIG. 1, in accordance with an embodiment of the present invention. In some embodiments of the present invention, guardian application 400 operates on computing device 120 which is located local to the environment area. In other embodiments, guardian program 400 operates in a cloud environment and interacts with components of the virtual guardian system via network connections. To more clearly present the distinguishing aspects of embodiments of the present invention, a specific example of a swim area environment will be presented with respect to guardian program 400; however, embodiments of the present invention are not limited to a specific environment area and will find benefit and value in implementations directed to a plurality of environment areas.

Guardian program 400 detects and/or identifies one or more users entering or occupying a swim area environment (step 410). Guardian program 400 receives audio, video, and sensor input from the swim area environment, and detects users accessing the environment. In some embodiments of the present invention, the individual users are identified, for example, based on identification information in respective user's profile, which may include facial recognition from video cameras, voice recognition from microphone input, finger prints from readers, or identification items, such as smart cards, RFID chips, or barcodes. In some embodiments, guardian program 400 determines one or more users accessing the swim area environment as unidentified, without a user/swimmer profile established. Guardian program 400 requires interaction with the unidentified users and establishes an initial profile, which may include name, age, activity skill level, and other voluntary information, and includes identification information added to the initial profile. If house rules allow, the user is granted access to the swim area environment, and the user's profile may be further updated based on monitoring of behavior and activity of the user.

For example, three users approach the entry of the swim area environment. The users pause at a video camera that uses images of the users to determine identity based on facial recognition data stored in the respective user's profile. Guardian program 400 determines the identity of two of the three users as being allowed access to the swim area environment for the current time and date, but the third user is unknown. Guardian program 400 uses computer-generated natural language voice instructions to request information from the unknown user. Guardian program 400 receives a facial image of the user, as well as input from the user for name, age, and activity (swim) skill level, as well as voluntary information that the user likes to swim underwater. The information and facial image are stored in an initial profile for the user in profile repository 170 (FIG. 1).

Guardian program 400 monitors the activity and behavior of users within the swim area environment (step 420). In some embodiments, users accessing the swim area environment are informed that the environment includes a virtual safety guardian, and that their use of the environment indicates their consent to monitoring of their activity within the environment. The activity and behavior of the users within the swim area environment is continually monitored until guardian program 400 detects that users have left the swim area environment. Monitoring of activity and behavior, with implied or provided consent by attending users, includes input from video cameras positioned in multiple locations within the swim area environment, as well as microphones to monitor sounds within the environment. In some embodiments, guardian program 400 also receives sensor input, such as wave detection, proximity sensor input, and swim area environment conditions such as air and water temperature, weather, and time of day.

During monitoring of the activity and behavior of the swim area environment, guardian program 400 interacts with users in the environment using cognitive communication services (step 430). In some embodiments of the present invention, cognitive communication services include computer-generated natural language conversation with users of swim area environment. In some embodiments, guardian program 400 may deliver instructions to users of the swim area environment, whereas in other embodiments, guardian program 400 queries one or more users to determine whether the user considers their status as safe. Guardian program 400 anticipates a vocal response to the query from the user, listening for and interpreting the response. In some embodiments if guardian program 400 does not receive a response within a pre-determined time period, the query may be repeated or in other embodiments, guardian program 400 may determine a response action is appropriate, such as an alert, alarm, notification, or deploying rescue devices.

Guardian program 400 analyzes activity and behavior of users based on house rules and user profiles (step 440). In some embodiments of the present invention, guardian program 400 analyzes the monitored activity and behavior of the users within the swim area environment in which the video images and audio sounds are compared to monitoring data categorized into various situations and context based on the house rules and the information in respective user's profiles. Guardian program 400 determines the categorization of the monitored activity and behavior in the context of house rules and user profiles.

For example, guardian program 400 determines from the video and audio monitoring whether there is a single user or multiple users occupying the swim area environment and has identified the user(s) from their profile information, or created a new, initial profile for an unidentified user. Guardian program 400 receives audio and video monitoring input and determines a situation and context by comparing the input to categorized monitoring data, in the context of the house rules and user profiles. The house rules may dictate a total allowable number of users occupying the swim area environment and may require at least one user with a high level of swimming skills. The house rules may prohibit a single user with swim skills below a pre-defined level and may prohibit use of the swim area environment after or before a certain time of day. In some embodiments, guardian program 400 determines from user profile information that a user may exhibit more risky physical behavior and includes the information in determining the context of activity and behavior.

Having determined the activity and behavior context with respect to house rules and user profiles, guardian program 400 determines whether there is unsafe activity or behavior, or if the activity and behavior violates house rules (decision step 450). Guardian program 400 identifies an unsafe situation of activity and user behavior by determining whether the context of the situation within the environment fails to satisfy pre-determined house rules and profile information and comparison of current monitoring data to monitoring data determined to be unsafe, high risk, or in violation of house rules. The determination of monitoring data to be unsafe, high risk, or in violation house rules is based on supervised machine learning by categorization of logged monitoring data and in some embodiments, unsupervised machine learning from continual monitoring of the swim area environment applied to a neural network. In some embodiments of the present invention, guardian program 400 enables an administrator of the swim area environment to review logged monitoring data of audio and video activity and behavior, for example, by use of guardian app 117 on mobile device 110, and categorize the behavior, taking into account the context of the situation and the particular users within the monitoring data.

In the case in which guardian program 400 determines that the current monitoring of activity and behavior within the swim area environment does not indicate an unsafe or high risk situation, or violate house rules, with respect to the context of the situation and the profile information of the user (step 450, "NO" branch), guardian program 400 proceeds to step 480 and determines whether to continue monitoring of activity and behavior of users within the swim area environment, and follows the description of step 480, detailed below. For the case in which guardian program 400 determines that the current monitoring of activity and behavior within the swim area environment is unsafe or high risk, or in violation of house rules (step 450 "YES" branch), guardian program 400 proceeds to step 460 and deploys a mitigating action.

Guardian program 400 deploys a mitigating action (step 460) in response to determining that an unsafe, high risk, or house rules violation situation exists within the swim area environment. In some embodiments, the mitigating action may include prohibiting access to the swim area environment, such as if a lone young user having poor swim skills tries to get access to the swim area. Guardian program 400 may also prohibit access for a group of users that include profile data indicating a history of risky behavior, ignoring house rules, and defiant to instructions. In some embodiments, guardian program 400 may over-ride entry access input to a locked gate, such as access gate 220 (FIG. 2) and disable keypad 250 such that access gate 220 remains locked. In some embodiments, guardian program 400 invokes conversational services, utilizing machine natural language and speech recognition techniques to convey instructions to cease the unsafe behavior or query a condition of a user to determine the user's safety status. In some embodiments, guardian program 400 anticipates a response to confirm comprehension of the instructions or confirm a user's status.

In some embodiments, guardian program 400 determines that the swim area environment situation requires deployment of an alarm to bring immediate attention to the actions or behavioral situation. The alarm may be audible and may include visual signals as well as generating alert messages and notifications to wireless mobile devices. In some embodiments, guardian program 400 may initiate an emergency 911 call to obtain medical or rescue responses to the swim area environment. In some embodiments, guardian program 400 deploys available rescue services which may include, for example, deploying floatation devices or raising a mechanical mesh to lift contents of a swim area above water level.

Guardian program 400 determines whether the unsafe situation is resolved (decision step 470). Guardian program 400 continues analysis of monitored activity and behavior within the swim area environment, determining whether the deployment of mitigating action has resolved the unsafe situation. In some embodiments determination of the unsafe situation being resolved may include receiving audible feedback such as a user verbally acknowledging a safe status or discontinuation of unsafe activity. In other embodiments, resolution of the unsafe situation may be indicated by video analysis of activity subsequent to deployment of the mitigating actions, such as a user grabbing a floatation device and maneuvering to a position in the swim area environment at which the user can stand and exit the water. In some embodiments, the situation may be violation of house rules, in which a particular user is not to be left alone in the swim area environment without a user having a high level of swim skills physically present. The resolution of the situation may be the video recognition of the return and acknowledgement of the high swim skill level user to the swim area environment.

For the case in which the unsafe situation is resolved (step 470, "YES" branch), guardian program 400 determines whether the swim area environment is to be continued (decision step 480). In some embodiments, monitoring of the swim area environment continues as long as guardian program 400 detects activity or user presence within the swim area environment (step 480 "YES" branch), and proceeds to step 420 and continues monitoring of activity and behavior of the swim area environment.

For the case in which guardian program 400 determines that the unsafe situation of the swim area environment is not resolved (step 470 "NO" branch), guardian program 400 returns to step 460 and escalates the deployment of mitigating actions. In some embodiments of the present invention, guardian program 400 includes a library of actions and responses to take aligned with categorized situations, actions, or violation of house rules. In some embodiments the library of actions is organized into a decision tree that includes a path of escalating actions in the event that an unsafe situation or violation of house rules is not mitigated. For example, detection of dangerous behavior of users jumping on other users in the water, guardian program 400 may deploy verbal instructions to cease the behavior immediately, and determining that the behavior continues, may initiate an audible alarm and transmit alerts and notifications to designated mobile devices. If the behavior continues the audible alarm may increase in intensity until it is uncomfortable to remain in the swim area environment.

Guardian program 400 determines whether to continue monitoring of activity and behavior within the swim area environment (decision step 480). In some embodiments, monitoring of the swim area environment continues as long as guardian program 400 detects activity or user presence within the swim area environment (step 480 "YES" branch), and returns to step 420 and continues monitoring of activity and behavior of the swim area environment. For the case in which guardian program detects an absence of users and no detection of activity or sensor input indicating activity within the swim area environment, (step 480 "NO" branch), guardian program 400 ends. In some embodiments, guardian program 400 remains in a "listen" mode to detect indication of users accessing or within the swim area environment and returns to step 410 to perform identification of the user. In some embodiments, guardian program 400 is manually terminated by an authorized administrator.

To further illustrate the aspects of embodiments of the present invention, the following three scenarios are presented.

A first scenario includes a young child detected alone in the swim area environment. Using video cameras, audio and sensor input, and corresponding analytics, the guardian system determines that a person has entered the swim area. The person is recognized by facial features, behavior patterns, relative age, and gender identification and determined to be a child that is a member of the swim area owner's household who does not have adequate swimming skills.

Because the child is walking in the general direction of the swim area, the guardian system determines three actions that are appropriate to address this high-risk situation: 1: Attempt to use the speaker system to send communication to the child "Billy, please stay away from the water and go back inside." 2: Send a message to the parents' cell phones providing video and context (using the profiled contact list) with an option to open a communication channel directly between the mobile app (guardian app 117, FIG. 1) and the guardian system's speakers at the pool. 3: Raise the "grid" from the bottom of the pool until or unless the child goes back inside, or an appropriate adult is able to "reset" the guardian system, indicating that the swim area environment is now safe.

A second scenario includes children in a playground environment with some adults present. Using video cameras and corresponding video analytics, the guardian system determines that two of the adults are facing away from the playground area engrossed in conversation. The system detects one of the users as a young child approaching an access point of the playground away from the conversing adults. Video analytics can determine the general age range of an individual. The system recognizes the young child using facial features, size, behavior patterns, and age/gender identification. The guardian system detects that the young child continues towards the access point and may exit the playground environment without adult supervision (as a violation of house rules). The guardian system sounds an audible alert that an unescorted child is leaving the environment, interrupting and notifying the conversing adults that respond and redirect the child before exiting the playground area. In some embodiments, the guardian system may provide more specific alerts when adult-child relationships are recognized and provide alerts and streaming video to the appropriate adult on their smart device.

A third scenario includes an adult exercising at late hours alone in a 24 hour access gym and an injury occurring. Using video cameras, audio input and corresponding analytics, the guardian system determines that a person has entered the exercise environment. The system recognizes the person (using facial features, behavior patterns and age/gender identification) as an adult who is a member of the exercise environment. Once the system identifies the person, it welcomes the individual and begins to monitor any activities. As the person exercises, the system is monitoring the person for any unusual actions using computer vision technology. As the person exits a particular piece of exercise equipment, the person stumbles and hits their head on a nearby weight rack. The person appears to be unconscious, and the system's video cameras identify that the person is on the floor and not moving. The system triggers an audible alarm and asks if the person is okay. Receiving no response and the person is detected as still not moving, the guardian system alerts emergency services to respond to the facility. Alternatively, if the person is okay and is responding to the system, there is no action that is taken.

Figure 5:
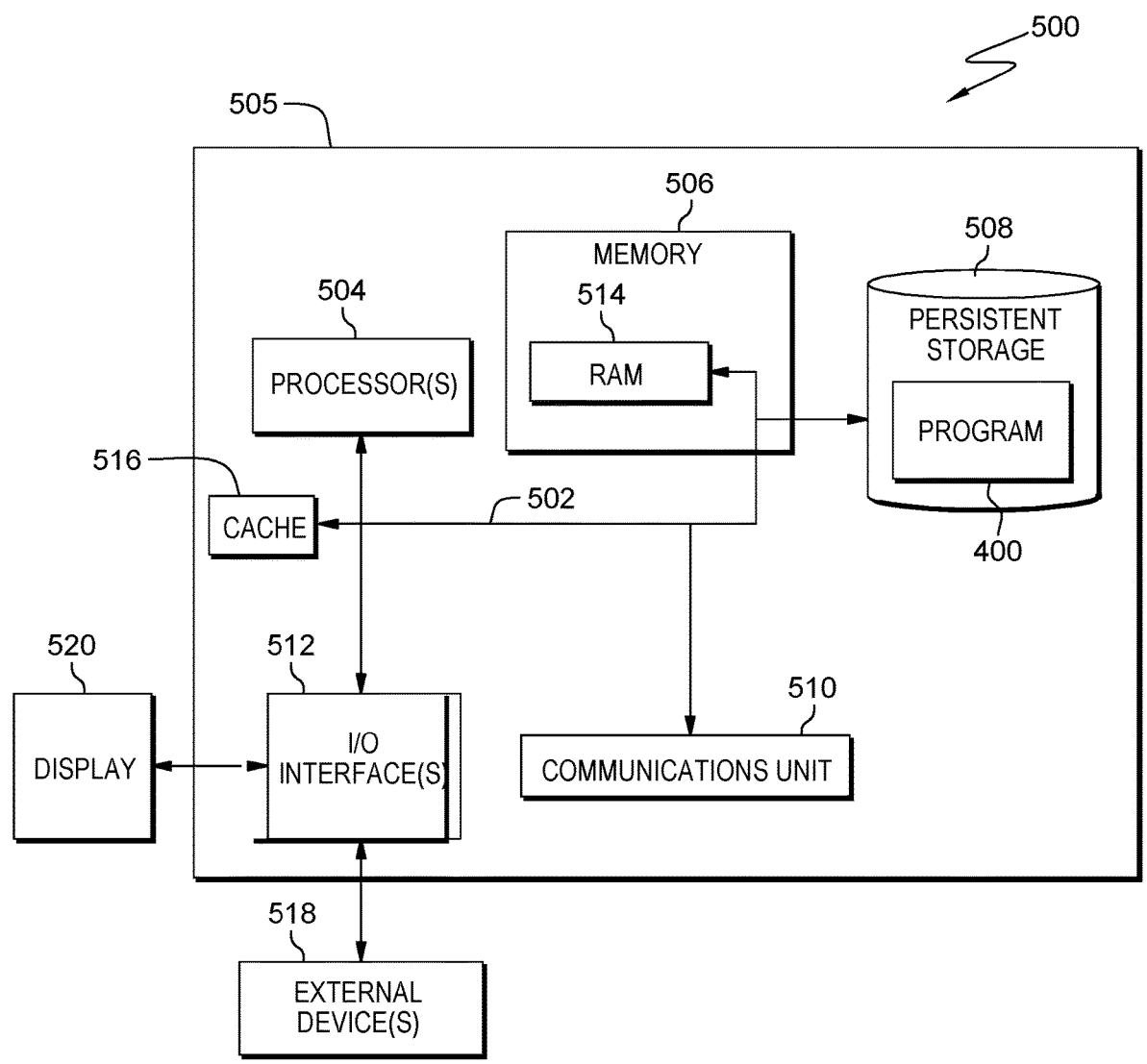
FIG. 5 depicts a block diagram of components of a computing system, including a computing device capable of operationally connecting to components depicted in FIG. 3, and performing the guardian program of FIG. 4, in accordance with an embodiment of the present invention.

FIG. 5 depicts a block diagram of components of computing system 500, including a computing device 505 capable of operationally including or connecting to components depicted in FIG. 3, and performing the guardian program 400 of FIG. 4, in accordance with an embodiment of the present invention.

Computing device 505 includes components and functional capability similar to mobile device 110 and computing device 120 (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

In one embodiment, guardian program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Guardian program 400 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., guardian program 400 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for monitoring safety conditions within an environment, the method comprising:
   one or more processors identifying one or more users accessing the environment based on existing profiles and generic profiles selected by visual recognition and analysis techniques;
   the one or more processors monitoring activity of the one or more users within the environment;
   the one or more processors determining a context of a situation of the one or more users accessing the environment, based on a set of predetermined rules tailored to the environment, identification of the one or more users based on the existing profiles and generic profiles selected, and monitoring data from monitoring the activity of the one or more users within the environment;

responsive to determining the context of the situation within the environment to be unsafe, based on the context of the situation within the environment not satisfying the set of predetermined rules as determined by analysis of the monitoring data and user profiles, the one or more processors selecting a mitigating action from a set of mitigating actions corresponding to the determined context of the situation that is unsafe; and the one or more processors automatically deploying the mitigating action.

2. The method of claim 1, wherein the set of mitigating actions includes a decision tree of escalating actions to mitigate the determined situational context that is unsafe.

3. The method of claim 1, wherein determining the context of the situation within the environment further comprises:

the one or more processors receiving input categorizing the monitoring data of activity of the one or more users within the environment with respect to a level of unsafe risk as determined by the context of the situation within the environment not satisfying the set of predetermined rules as determined by analysis of the monitoring data and the user profiles;

the one or more processors generating a cognitive behavior model using a neural network and machine learning, wherein the cognitive behavior model is based on supervised learning utilizing the monitoring data from monitoring the activity of the one or more users within the environment that is categorized to align with the set of predetermined rules, the respective existing profiles and generic profiles of the one or more users, and the activity of the one or more users that is labeled;

the one or more processors receiving the analysis of the monitoring data from monitoring the activity of the one or more users within the environment; and the one or more processors determining an unsafe situation of the activity of the one or more users within the environment based on an output of the cognitive behavior model.

4. The method of claim 1, further comprising:

the one or more processors receiving the set of predetermined rules, wherein the predetermined rules are configurable by an administrator of the environment;

the one or more processors determining whether a rule of the set of predetermined rules is violated by comparing the monitoring data from monitoring the activity of the one or more users to logged previously monitored data that is categorized based on the set of predetermined rules and the context of the situation which is determined to be unsafe;

the one or more processors aligning a mitigating action of the set of mitigating actions to either or both of a violation of the rule of the set of predetermined rules and the context of the situation determined to be unsafe; and responsive to determining the rule of the set of predetermined rules is violated, the one or more processors deploying the mitigating action aligned with the rule that is violated.

5. The method of claim 1, wherein the existing profiles include one or more of:

biometric identification data, activity skill level, and behavioral characteristics of respective users of the one or more users accessing the environment.

6. The method of claim 1, wherein an administrator of the environment defines a configurable set of predetermined rules aligned with a particular environment.

7. The method of claim 1, wherein automatically deploying the mitigating action further comprises:

the one or more processors transmitting a notification to a mobile device designated by an administrator of the environment;

in response to receiving a request to view the context of the situation within the environment, the one or more processors transmitting a live feed of the activity of the one or more users within the environment; and in response to receiving a request to override the mitigating action, the one or more processors suspending the mitigating action and receiving input defining an alternate mitigating action.

8. A computer program product for monitoring safety conditions within an environment, the computer program product comprising:

one or more computer readable storage media and program instructions stored on the one or more computer readable storage media, the program instructions comprising:

program instructions to identify one or more users accessing the environment based on existing profiles and generic profiles selected based on visual recognition and analysis techniques;

one or more processors monitoring activity of the one or more users within the environment;

program instructions to determine a context of a situation of the one or more users accessing the environment, based on a set of predetermined rules tailored to the environment, identification of the one or more users based on the existing profiles and generic profiles selected, and monitoring data from monitoring the activity of the one or more users within the environment;

responsive to determining the context of the situation within the environment to be unsafe, based on the context of the situation within the environment not satisfying the set of predetermined rules as determined by analysis of the monitoring data and user profiles, program instructions to select a mitigating action from a set of mitigating actions corresponding to the determined context of the situation that is unsafe; and program instructions to automatically deploy the mitigating action.

9. The computer program product of claim 8, wherein the set of mitigating actions includes a decision tree of escalating actions to mitigate the determined situational context that is unsafe.

10. The computer program product of claim 8, where in determining the context of the situation within the environment further comprises:

program instructions to receive input categorizing the monitoring data from monitoring the activity of the one or more users within the environment with respect to a level of unsafe risk as determined by the context of the situation within the environment not satisfying the set of predetermined rules as determined by analysis of the monitoring data and the user profiles;

program instructions to generate a cognitive behavior model using a neural network and machine learning, wherein the cognitive behavior model is based on supervised learning utilizing the monitoring data from monitoring the activity that is categorized to align with the set of predetermined rules, the respective existing profiles and generic profiles of the one or more users, and user activity that is labeled;

receiving the analysis of the monitoring data from monitoring the activity of the one or more users within the environment; and determining an unsafe situation of activity of the one or more users within the environment based on an output of the cognitive behavior model.

11. The computer program product of claim 8, further comprising:

receiving the set of predetermined rules, wherein the predetermined rules are configurable by an administrator of the environment;

determining whether a rule of the set of predetermined rules is violated by comparing the monitoring data from monitoring the activity of the one or more users to logged previously monitored data that is categorized based on the set of predetermined rules and the context of the situation determined to be unsafe;

aligning a mitigating action of the set of mitigating actions to either or both of a violation of the rule of the set of predetermined rules and the situational context known to be unsafe; and responsive to determining the rule of the set of predetermined rules is violated, program instructions to deploy the mitigating action aligned with the rule that is violated.

12. The computer program product of claim 8, wherein the existing profiles include biometric identification data, activity skill level, and behavioral characteristics of respective users of the one or more users accessing the environment.

13. The computer program product of claim 8, wherein an administrator of the environment defines a configurable set of predetermined rules aligned with a particular environment.

14. The computer program product of claim 8, wherein automatically deploying the mitigating action further comprises:

program instructions to transmit a notification to a mobile device designated by an administrator of the environment;

in response to receiving a request to view the context of the situation within the environment, program instructions to transmit a live feed of the activity of the one or more users within the environment; and in response to receiving a request to override the mitigating action, program instructions to suspend the mitigating action and receive input defining an alternate mitigating action.

15. A computer system for monitoring safety conditions within an environment, the computer system comprising:

one or more computer processors;

one or more computer readable storage media; and program instructions stored on the one or more computer readable storage media, the program instructions comprising:

program instructions to identify one or more users accessing the environment based on existing profiles and generic profiles selected by visual recognition and analysis techniques;

program instructions to monitor activity of the one or more users within the environment;

program instructions to determine a context of a situation of the one or more users accessing the environment, based on a set of predetermined rules tailored to the environment and identified users of the one or more users, and monitoring data from monitoring the activity of the one or more users within the environment;

responsive to determining the context of the situation within the environment to be unsafe, based on the context of the situation within the environment not satisfying the set of predetermined rules as determined by analysis of the monitoring data and user profiles, program instructions to select a mitigating action corresponding to the determined context of the situation that is unsafe from a set of mitigating actions; and program instructions to automatically deploy the mitigating action.

16. The computer system of claim 15, wherein the set of mitigating actions includes a decision tree of escalating actions to mitigate the determined situational context that is unsafe.

17. The computer system of claim 15, where in determining the context of the situation within the environment further comprises:

program instructions to receive input categorizing the monitoring data from monitoring the activity of the one or more users within the environment with respect to a level of unsafe risk as determined by the context of the situation within the environment not satisfying the set of predetermined rules as determined by analysis of the monitoring data and the user profiles;

program instructions to generate a cognitive behavior model using a neural network and machine learning, wherein the cognitive behavior model is based on supervised learning utilizing the monitoring data from monitoring the activity that is categorized to align with the set of predetermined rules, the respective existing profiles and generic profiles of the one or more users, and user activity that is labeled;

program instructions to receive the analysis of the monitoring data of activity of the one or more users within the environment; and program instructions to determine an unsafe situation of activity of the one or more users within the environment based on an output of the cognitive behavior model.

18. The computer system of claim 15, further comprising:

program instructions to receive the set of predetermined rules, wherein the predetermined rules are configurable by an administrator of the environment;

program instructions to determine whether a rule of the set of predetermined rules is violated by comparing the monitoring data from monitoring the activity of the one or more users to logged previously monitored data that is categorized based on the set of predetermined rules and the context of the situation determined to be unsafe;

program instructions to align a mitigating action of the set of mitigating actions to either or both of a violation of the rule of the set of predetermined rules and the situational context known to be unsafe; and responsive to determining the rule of the set of predetermined rules is violated, program instructions to deploy the mitigating action aligned with the rule that is violated.

19. The computer system of claim 15, wherein the existing profiles include biometric identification data, activity skill level, and behavioral characteristics of respective users of the one or more users accessing the environment.

20. The computer system of claim 15, wherein automatically deploying the mitigating action further comprises:
  program instructions to transmit a notification to a mobile device designated by an administrator of the environment;
  in response to receiving a request to view the context of the situation within the environment, program instructions to transmit a live feed of the activity of the one or more users within the environment; and
  in response to receiving a request to override the mitigating action, program instructions to suspend the mitigating action and receiving input defining an alternate mitigating action.

\* \* \* \* \*